United States Patent [19]

Esayan et al.

[11] Patent Number: 4,510,118
[45] Date of Patent: Apr. 9, 1985

[54] DEVICE FOR SAFETY INJECTION ON A PRESSURIZED-WATER NUCLEAR REACTOR

[75] Inventors: Mariana Esayan, Courbevoie; Michel Vilain, Le Pecq, both of France

[73] Assignee: Framatome & Cie., Courbevoie, France

[21] Appl. No.: 434,139

[22] Filed: Oct. 12, 1982

[30] Foreign Application Priority Data

Oct. 16, 1981 [FR] France ................................ 81 19478

[51] Int. Cl.³ .............................................. G21C 9/00
[52] U.S. Cl. ..................................... 376/282; 376/283; 376/402
[58] Field of Search ......................... 376/282, 283, 402

[56] References Cited

U.S. PATENT DOCUMENTS

| | | | |
|---|---|---|---|
| 4,078,966 | 3/1978 | Verdeau | 376/282 |
| 4,104,119 | 8/1978 | Schilling | 376/282 |
| 4,243,485 | 1/1981 | Chabin | 376/313 |
| 4,278,500 | 7/1981 | Ailloud | 376/282 |

Primary Examiner—Donald P. Walsh
Attorney, Agent, or Firm—Pollock, Vande Sande & Priddy

[57] ABSTRACT

Device for safety injection on a pressurized-water nuclear reactor, including at least two separate injection trains each consisting of at least one set of means (60, 61, 62) for pumping water from a reservoir (58, 59) arranged outside the safety enclosure, and a main injection pipe (64, 65) connected to a distributor drum (70, 70') for the distribution of the water into each of the cold arms of the primary circuit. From each of the main pipes (64, 65) there is tapped off outside the enclosure an auxiliary pipe (84, 85) in which is located a block valve (96, 97). The auxiliary pipes (84, 85) include a branching-off (86, 87, 88, 89) for placing the auxiliary pipe (84, 85) into communication firstly with a cold arm (52, 53, 54, 55) and secondly with a hot arm (56, 56'). The invention is applicable in the event of leakage in the primary circuit of a pressurized-water nuclear reactor.

4 Claims, 2 Drawing Figures

DEVICE FOR SAFETY INJECTION ON A PRESSURIZED-WATER NUCLEAR REACTOR

FIELD OF THE INVENTION

The invention relates to a device for safety injection on a pressurized-water nuclear reactor, for injection of water into the primary circuit in the event of leakage in this circuit.

BACKGROUND OF THE INVENTION

The primary circuit of a pressurized-water nuclear reactor during the course of operation contains water containing boric acid at a pressure of about 155 bars, which serves both for cooling the core of the reactor arranged in the vessel and for the control of the reactivity of this core. The primary circuit of the reactor includes a number of loops, generally three or four, in each of which is placed a steam generator which enables evaporation of the feed water by employing the heat from the reactor core conveyed by the water under pressure in the primary circuit.

Each of the loops of the primary circuit includes a portion of pipework called the "cold arm" in communication with the interior of the reactor vessel and bringing the primary water inside this vessel where it comes into contact with the core of the reactor, as well as a portion of pipework called the "hot arm", likewise in communication with the interior of the reactor vessel, through which the water heated by contact with the core is discharged towards the steam generators.

If the primary circuit exhibits a leak it is necessary to compensate it by an injection of additional water into this circuit. In the event of a very large leak and, for example, in the event of a real rupture of a pipe in the primary circuit, it is necessary to pass very large amounts of cooling liquid, consisting of water with the addition of boric acid, within a very short time in order to avoid a very high rise in temperature in the core which might cause it to melt.

In the case of large leaks it is necessary to put into operation a reactor emergency cooling device by injection of cooling liquid, called a safety injection system.

Such a device for safety injection includes at least two injection trains, each consisting of a reserve of water with the addition of boric acid, and at least one set of means for pumping at one or more different pressures, arranged outside the safety enclosure of the reactor. This device for safety injection likewise includes accumulators arranged inside the safety enclosure of the reactor, containing cooling water under pressure and capable of injecting a first amount of water very rapidly into the cold arms of the primary circuit of the reactor.

Each of the injection trains of the safety device includes as many injection pipes receiving the water from a pumping means as there are pumping means at different pressures in the train in question. Thus each of the trains may include, for example, both low-pressure, medium-pressure and high-pressure pumps. In this case the injection train will include three injection pipes, called main pipes, which pass through the safety enclosure of the reactor and are each connected inside the safety enclosure to a distributor drum enabling the injected water to be distributed into the various cold arms of the primary circuit. In each of the main injection pipes there is arranged a block valve outside the safety enclosure of the reactor.

At the outlet from the drums, the distribution of the injected water into the various cold arms of the primary circuit is effected through distributor pipes in which are arranged non-return valves enabling the return of water from the primary circuit towards the drums to be avoided.

In the case of injection trains including low, medium and high-pressure pumps, there are arranged inside the enclosure three drums which receive and distribute the water from the main pipes of each of the trains connected respectively to the low, medium and high-pressure pumping means.

In the event of a rupture of a cold arm of the primary circuit, the concentration of boric acid in the cooling liquid lying in the vessel increases continuously during the first phase of injection into the cold arms. In fact, during this injection the steam produced during the cooling of the core is released into the safety enclosure of the reactor. This steam carries along a small amount of boric acid, with the result that the concentration of boric acid in the liquid remaining in the vessel has a tendency to increase continuously, whereas the concentration in the reserve of cooling liquid which is recycled falls continuously.

It is then necessary to bring about an injection through the hot arms of the primary circuit in order to drive the cooling liquid having a high concentration of boric acid from the vessel and to cause the evaporation to cease. The direction of circulation in the vessel is then reversed and the cooling liquid injected can escape, after mixing, through the breach in the cold arm in liquid form.

In order to carry out this injection into the hot arms alternately with respect to the injection into the cold arms or simultaneously with this injection into the cold arms, there is provided in each of the main injection pipes of each of the trains a line tapped off towards the hot arms, which enters the enclosure and in which is located a block valve outside the enclosure.

These injection lines into the hot arms are generally grouped on drums depending upon the pressure of injection in the line in question. The drums as in the case of the cold arms ensure the distribution of the injected water into the various hot arms. These injection lines may equally well be grouped per train for injection into a hot arm.

In any case, if a rupture occurs at the level of a drum which groups the whole of the main pipes for injection into the cold arms at a certain pressure or the whole of the lines for injection into the hot arms at a certain pressure, the safety injection is no longer ensured for the range of pressure corresponding to this drum.

If the number of members providing the same function is multiplied in order to increase the safety of the device in operation, the complexity of the whole becomes too great.

SUMMARY OF THE INVENTION

Hence the aim of the invention is to propose a device for safety injection in a pressurized-water nuclear reactor, for the injeciton of cooling water into the primary circuit in the event of leakage in this circuit, including at least two separate injection trains each consisting of at least one set of means of pumping water at a given pressure from a reservoir arranged outside the safety enclosure of the reactor and an injection pipe called the main pipe which receives the water leaving the pumping means and enters the enclosure of the reactor and is connected to a distributor drum arranged inside the enclosure for the distribution of the water from the main pipe into each of the cold arms of the primary circuit through distributor pipes, at least one block valve being located in the main pipe outside the enclosure and at least one clack-valve being located in each of the distributor pipes between the drums and the cold arms, this device for safety injection ensuring sufficient injection of cooling water into the primary circuit even in the event of rupture of a passive member of the safety device.

With this aim, from each of the main pipes there is tapped off outside the enclosure an auxiliary pipe which enters the enclosure and in which is located a block valve outside the enclosure, and which has a branching-off inside the enclosure for putting the auxiliary pipe into communication firstly with a hot arm by way of a first pipe and secondly with a distributor pipe connected to a cold arm downstream of the clack-valve arranged in this distributor pipe, by way of a second pipe, clack-valves being arranged in each of the pipes of the branching-off.

BRIEF DESCRIPTION OF THE DRAWINGS

In order that the invention may be clearly understood there will now be described by way of example a device for safety injection in accordance with the prior art and a device for safety injection in accordance with the invention.

DETAILED DESCRIPTION

Figure 1:
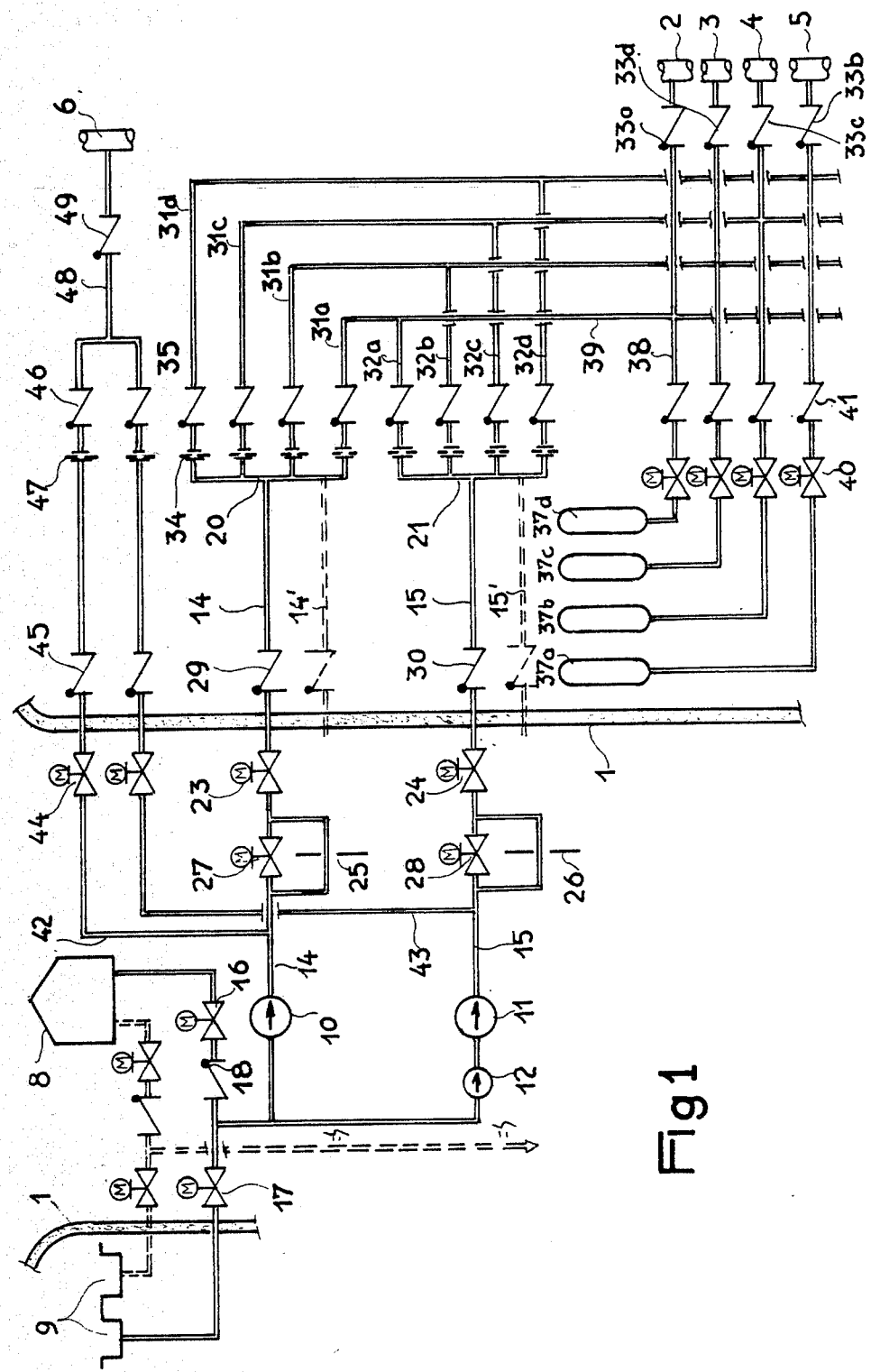
FIG. 1 is a diagrammatic view of a prior art device for safety injection at two pressure levels in for a nuclear reactor having four loops.

FIG. 1 illustrates the safety enclosure 1 of the reactor inside which are arranged the vessel and the primary circuit including four cold arms 2,3,4 and 5 and four hot arms only one, 6, of which has been shown.

The reactor safety injection device includes two injection trains only one of which has been shown in full and in solid lines. The other injection train has been shown partially and in dotted lines.

The device for safety injection employs a reserve of water consisting of the reservoir 8 included in the system of storage and treatment of the water from the reactor swimming-pool, and of the recirculation sumps 9 which recover the water sprayed inside the safety enclosure of the reactor and the condensed phase in the event of an incident in the primary circuit.

Each of the injection trains includes a low-pressure pump 10 and a medium-pressure pump 11 fed by a cramming pump 12.

At the outlet from the low-pressure pump 10, the water is passed into a main injection pipe 14, and a main injection pipe 15 enables injection of the water delivered by the medium-pressure pump 11.

Motorized valves 16 and 17 enable the water for injection to be pumped either from the reservoir 8 or from the sumps 9.

The pipes 14 and 15 pass through the safety enclosure 1 in order to enter this enclosure where they are connected to drums 20 and 21, respectively.

In the pipes 14 and 15, respectively, there are arranged outside the enclosure block valves 23 and 24 enabling selectively feeding of the drums 20 and 21 or closing of the communication between the supply from the pipes 14 and 15 and these drums.

Diaphragms 25 and 26 arranged in by-passes from the main pipes 14 and 15 enable the delivery to be distributed in this pipework when the block valves 27 and 28 are closed and there is simultaneous injection into the hot and cold arms.

In the portion of the pipes 14 and 15 arranged inside the enclosure downstream of the drums 20 and 21 there are located non-return valves 29 and 30.

The second injection train represented partially and in dotted lines, fed from the reservoir 8 and the sumps 9, includes the same members as the train shown, its pipe 14' fed by the low-pressure pump being connected to the drum 20 and its pipe 15' fed by the medium-pressure pump being connected to the medium-pressure drum 21.

Distributor pipes 31a, 31b, 31c and 31d leaving the drum 20, and 32a, 32b, 32c and 32d leaving the drum 21 are firstly connected together and secondly connected to each of the cold arms 2,3,4 and 5 with the interposition of non-return valves 33a, 33b, 33c and 33d.

In each of the distributor pipes 31 and in each of the distributor pipes 32, upstream of their point of join, there is arranged an orifice 34 for regulation of the delivery, and a non-return valve 35.

A battery of four accumulators 37a to 37d enables injection into each of the cold arms by distributor pipes 38 connected each to a distributor pipe 39 arranged upstream of the junction between two distributor pipes 31 and 32.

A block valve 40 and a non-return valve 41 are arranged in each of the distributor pipes 38 and respectively enable the accumulators 37 to be isolated and protected from the cold arms to which they are connected.

The injection into the hot arms 6 is effected by auxiliary injection lines such as 42 tapped off from the pipe 14 and 43 tapped off from the pipe 15. The auxiliary lines 42 and 43 are likewise equipped with block valves 44, clack-valves 45 and 46 and an orifice 47 for regulation of the delivery, before their joining onto an injection pipe 48 in communication with the hot arm and including a non-return valve 49.

In the event of rupture of a drum such as 20, the pumping system of the safety injection associated with this drum becomes totally unavailable since the main low-pressure injection pipes 14 and 14' are connected to this drum for the injection into the whole of the cold arms of the primary circuit. This is incompatible with the certainty of operation required during the phase of simultaneous injection into cold and hot arms.

It is in fact necessary, in order to fulfil the function of safety injection to have available for a certain length of time (24 hours after the accident) means of injection simultaneously into cold arms and hot arms.

Hence an incident on only one passive member such as the drum 20 renders unavailable the low-pressure system of safety injection towards the cold arms.

Figure 2:
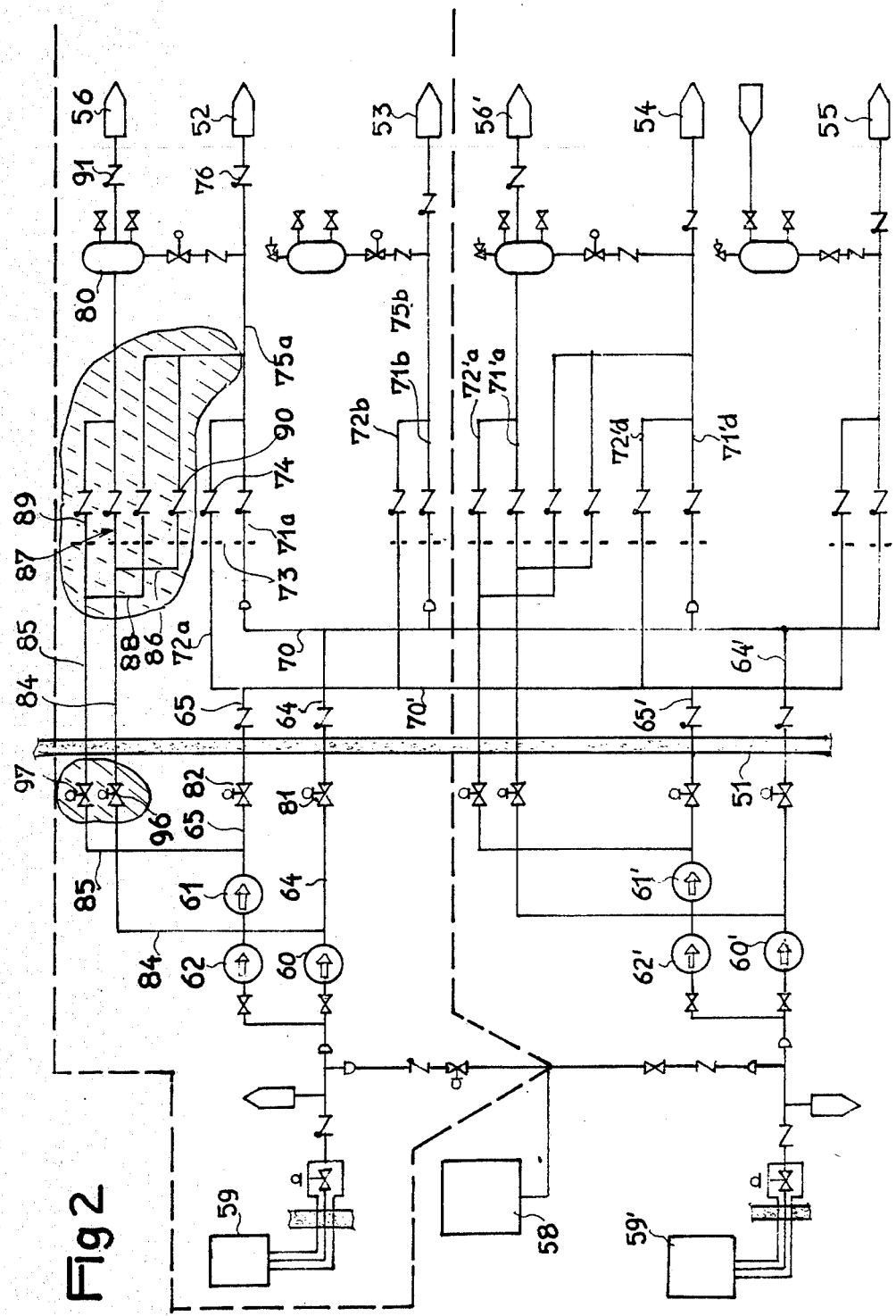
FIG. 2 shows diagrammatically a device for safety injection at two pressure levels in accordance with the invention, in the case of a nuclear reactor having four loops.

FIG. 2 shows a device for safety injection at two levels of pressure in accordance with the invention, installed outside and inside the safety enclosure 51 of a pressurized-water nuclear reactor having four loops.

The portion at the right of the figure corresponds to the members arranged inside the safety enclosure 51, and the portion at the left to the members arranged outside this enclosure. In FIG. 2 two injection trains have been shown, which form the reactor safety injection device. These two trains are identical and the corresponding members of one or the other will be designated with the same reference numerals but bearing for the second train the index '.

The primary circuit of the reactor includes four cold arms 52, 53, 54 and 55 and four hot arms such as 56 and 56' represented symbolically in FIG. 2.

The two trains of the device for safety injection are fed from the reservoir of the swimming pools 58 and the recirculation sumps 59 and 59' in the reactor enclosure. A low-pressure pump 60 and a medium-pressure pump 61 fed by a cramming pump 62 enables feeding of the main injection pipes 64 and 65 entering the safety enclosure 51. Inside the safety enclosure 51 the main low-pressure pipes 64 and 64' feed a drum 70 which enables the distribution of the injected water into the four cold arms 52, 53, 54 and 55, whereas the main medium-pressure pipes 65 and 65' are connected to a drum 70' likewise feeding the four cold arms.

On leaving the drums 70 and 70', the distribution of the water into the cold arms is effected by way of distributor pipes 71 and 72, respectively. In each of the distributor pipes 71 and 72 there are placed an orifice 73 for regulation of the delivery and a non-return valve 74. Downstream of the non-return valves 74 the distributor pipe 72 is connected to the distributor pipe 71 in order to form an injection pipe 75 enabling injection into the corresponding cold arm with the interposition of a non-return valve 76.

From each of the injection pipes 75 pressurized-water accumulators 80 are likewise tapped off to enable rapid injection of a first amount of water into the cold arms in the event of an accident.

Outside the enclosure in each of the main pipes 64 and 65, respectively, there are located block valves 81 and 82 enabling the injection pumps arranged outside the enclosure to be isolated from the drums arranged inside the safety enclosure 51.

Downstream of the pumps and upstream of the valves 81 and 82, auxiliary pipes 84 and 85 are tapped off from the main pipes 64 and 65, respectively. The block valves 96 and 97 are located outside the enclosure 51 on the auxiliary pipes 84 and 85, respectively.

The auxiliary pipes 84 and 85 enter the safety enclosure 51 and each include inside the enclosure a branching-off into two pipes 86 and 87 for the pipe 84, and 88 and 89 for the pipe 85. In each of the two pipes of each of the two branchings-off are located non-return valves such as 90 and orifices such as 73 for distribution of delivery.

One of the pipes of the branching-off, 86 in the case of the auxiliary pipe 84, and 88 in the case of the pipe 85, is connected to the injection pipe 75a in a cold arm, downstream of the clack-valves 74 located in the distributor pipes 71 and 72.

The other pipe from the branching-off, 87 in the case of the auxiliary pipe 84, and 89 in the case of the auxiliary pipe 85, is connected to the hot arm 56 with the interposition of a non-return valve 91.

Hence it may be seen that, upon closing the block valves 81 and 82 in the main pipes 64 and 65 and opening the block valves 86 and 87 in the auxiliary pipes 84 and 85, it is possible to inject cooling water simultaneously into the cold arm 52 and into the hot arm 56 without passing through the drums 70 and 71. The second train identical with the first effects the injection into another pair formed of a cold arm and a hot arm (54-56').

In the event of rupture of one of the branchings-off 86, 87 or 88, 89, the safety injection system with its two pressure levels, injecting both into the hot arms and the cold arms, remains operational due to the separation of the trains.

Hence, in order to achieve injection simultaneously into cold arm and hot arm it is sufficient to reverse the opening and closure of the valves 81, 82 on the one hand and 96, 97 on the other.

The second train represented in the lower portion of FIG. 2 is totally isolated from the first injection train and its operation, being totally independent of that of the first train, can continue in the event of an accident to any one of the active or passive members of the first injection train.

The auxiliary pipes 84 and 85 and their branchings-off for injection are in fact totally isolated from the drums to which are connected the main pipes of the two injection trains. The non-return valves 74 arranged in the distributor pipes 89, 88 and 87, 86 ensure protection against rupture of one of the branchings-off situated upstream.

The main advantages of the device in accordance with the invention are that, in spite of its great simplicity, it enables very simple achievement of simultaneous injection into cold arm and hot arm and the avoidance of any risk of total loss of injection in the event of an accident to one of these active or inactive members. The manipulation of the valves for isolation and tapping-off, located outside the enclosure, is extremely easy and checking the satisfactory operation of these valves enables effective swinging to be ensured from cold arm injection to hot arm injection after an accident.

The a safety system in accordance with the invention may be adapted just as well to a reactor having four loops as to a reactor having two or three loops.

The invention is applicable to any pressurized-water nuclear reactor, whatever the number of loops in the primary circuit and the number of ranges of pressure of the system of safety injection including at least two separate trains.

We claim:

1. Device for safety injection in a pressurized-water nuclear reactor, for the injection of cooling water into a primary circuit in the event of leakage therein, including at least two separate injection trains each consisting of at least one set of means (60, 61, 62) for pumping water at a given pressure from a reservoir (58, 59) arranged outside a safety enclosure (51) of said reactor and an injection pipe (64, 65), called the main pipe, which receives the water leaving said pumping means (60, 61, 62) and enters said safety enclosure (51) and is connected to a distributor drum (70, 70') arranged inside said enclosure (51) for the distribution of the water from main pipes (64, 65, 64', 65') into each of the cold arms (52, 53, 54, 55) of said primary circuit through distributor pipes (71, 72), at least one block valve (81, 82) being located in each of the main pipes (64, 65) outside said enclosure (51) and at least one non-return valve (76) being located in each of said distributor pipes (71, 72) between said drums (70, 70') and said cold arms (52, 53, 54, 55), from each of said main pipes (64, 65) there being tapped off outside said enclosure (51) an auxiliary pipe (84, 85) which enters said enclosure and in which is located a block valve (96, 97) outside said enclosure, and which has a branching-off (86, 87, 88, 89) inside said enclosure (51) for placing said auxiliary pipe (84, 85) into communication firstly with a hot arm (56, 56') by way of a first pipe and secondly with a distributor pipe connected to a cold arm (52, 53, 54, 55) downstream of a clack-valve (74) arranged in said distributor pipe (71, 72), by way of a second pipe, clack-valves (90) being arranged in each of said pipes (86, 87, 88, 89) of said branching-off.

2. Device for safety injection according to claim 1, in the case where each of said injection trains consists of at least two sets of means (60, 61, 62) for pumping at different pressures, each delivering into a main pipe (64, 65) connected to a distributor drum chosen from at least two drums (70, 71') located in said enclosure (51), depending upon the pressure of the water in said main pipe (64, 65), said auxiliary pipes (84, 85) associated with said main pipes (64, 65) of one and the same train being connected to the same pair (52, 56) of hot and cold arms of said primary circuit.

3. Device for safety injection according to claim 1 or 2, comprising orifices for regulation of delivery located in the two pipes (86, 87 and 88, 89) of the branching-off from said auxiliary pipes (84, 85) for regulation of the delivery of injection into said pair of cold and hot arms (52, 56).

4. Device for safety injection according to claim 1 or 2, in the case of a nuclear reactor having four loops, said device comprising two injection trains the auxiliary pipes (84, 85, 84', 85') of which are connected for each of said trains to one and the same pair of cold and hot arms, the injection through said auxiliary pipes (84, 85 and 84', 85') of the two trains being effected into two different pairs of cold and hot arms (52, 56 and 52', 56').

* * * * *